United States Patent
Mullins

(10) Patent No.: US 9,264,479 B2
(45) Date of Patent: Feb. 16, 2016

(54) OFFLOADING AUGMENTED REALITY PROCESSING

(71) Applicant: DAQRI, LLC, Los Angeles, CA (US)

(72) Inventor: Brian Mullins, Garden Grove, CA (US)

(73) Assignee: DAQRI, LLC, Los Angeles, CA (US)

(*) Notice: Subject to any disclaimer, the term of this patent is extended or adjusted under 35 U.S.C. 154(b) by 284 days.

(21) Appl. No.: 14/144,359

(22) Filed: Dec. 30, 2013

(65) Prior Publication Data

US 2015/0188984 A1 Jul. 2, 2015

(51) Int. Cl.
| | |
|---|---|
| G06F 15/16 | (2006.01) |
| H04L 29/08 | (2006.01) |
| G06T 1/20 | (2006.01) |
| G06T 19/00 | (2011.01) |
| H04L 29/06 | (2006.01) |

(52) U.S. Cl.
CPC . *H04L 67/04* (2013.01); *G06T 1/20* (2013.01); *G06T 19/006* (2013.01); *H04L 67/12* (2013.01); *H04L 67/18* (2013.01); *H04L 67/38* (2013.01); *G06T 2200/16* (2013.01)

(58) Field of Classification Search
CPC .................................................. H04L 65/4069
USPC ................................................. 709/203, 219
See application file for complete search history.

(56) References Cited

U.S. PATENT DOCUMENTS

| | | | | |
|---|---|---|---|---|
| 2007/0061101 A1* | 3/2007 | Greene | ............... | G01S 19/47 702/152 |
| 2008/0071559 A1* | 3/2008 | Arrasvuori | ......... | G06Q 30/06 705/26.1 |
| 2009/0102859 A1* | 4/2009 | Athsani | ................. | G06F 3/011 345/619 |
| 2010/0045662 A1* | 2/2010 | Boothroyd | ........ | G06F 17/30893 345/419 |
| 2011/0231781 A1 | 9/2011 | Betzler et al. | | |
| 2011/0246276 A1* | 10/2011 | Peters | ................. | G06Q 30/02 705/14.24 |
| 2012/0114297 A1 | 5/2012 | Adhikari et al. | | |
| 2012/0212405 A1 | 8/2012 | Newhouse et al. | | |
| 2013/0198176 A1 | 8/2013 | Kim | | |
| 2014/0002496 A1* | 1/2014 | Lamb | ....................... | G06F 3/14 345/633 |
| 2014/0016820 A1* | 1/2014 | Roberts | ............. | G06F 17/30805 382/103 |

(Continued)

FOREIGN PATENT DOCUMENTS

WO WO-2013093906 A1 6/2013

OTHER PUBLICATIONS

"International Application Serial No. PCT/US2014/069536, International Search Report mailed Mar. 12, 2015", 2 pgs.

(Continued)

*Primary Examiner* — Duyen Doan
(74) *Attorney, Agent, or Firm* — Schwegman Lundberg & Woessner, P.A.

(57) ABSTRACT

A system and method for offloading augmented reality processing is described. A sensor external to a viewing device of a user tracks a location and an orientation of the viewing device. The location and orientation are defined relative to predefined references of a physical environment local to the user. A server receives a request from the viewing device to offload at least one of a tracking process and an augmented reality rendering process. The augmented reality rendering process is based on an augmented reality database. The server generates offloaded processed data based on the request and the location and the orientation of the viewing device. The offloaded processed data is streamed to the viewing device. A visualization of the offloaded processed data is generated in the viewing device.

19 Claims, 12 Drawing Sheets

(56) References Cited

U.S. PATENT DOCUMENTS

| | | | | |
|---|---|---|---|---|
| 2014/0173674 A1* | 6/2014 | Wolman | ............... | H04N 21/25 725/116 |
| 2015/0032838 A1* | 1/2015 | Demsey | ............. | H04L 67/2842 709/213 |

OTHER PUBLICATIONS

"International Application Serial No. PCT/US2014/069536, Written Opinion mailed Mar. 12, 2015", 4 pgs.

* cited by examiner

OFFLOADING AUGMENTED REALITY PROCESSING

TECHNICAL FIELD

The subject matter disclosed herein generally relates to the processing of data. Specifically, the present disclosure addresses systems and methods for offloading rendering and tracking processes related to augmented reality.

BACKGROUND

A device can be used to generate and display data in addition to an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision and object recognition) the information about the surrounding real world of the user becomes interactive. Device-generated (e.g., artificial) information about the environment and its objects can be overlaid on the real world. However, small portable devices have limited computing resources that limit the rendering of device-generated objects.

BRIEF DESCRIPTION OF THE DRAWINGS

Some embodiments are illustrated by way of example and not limitation in the figures of the accompanying drawings.

DETAILED DESCRIPTION

Figure 1:
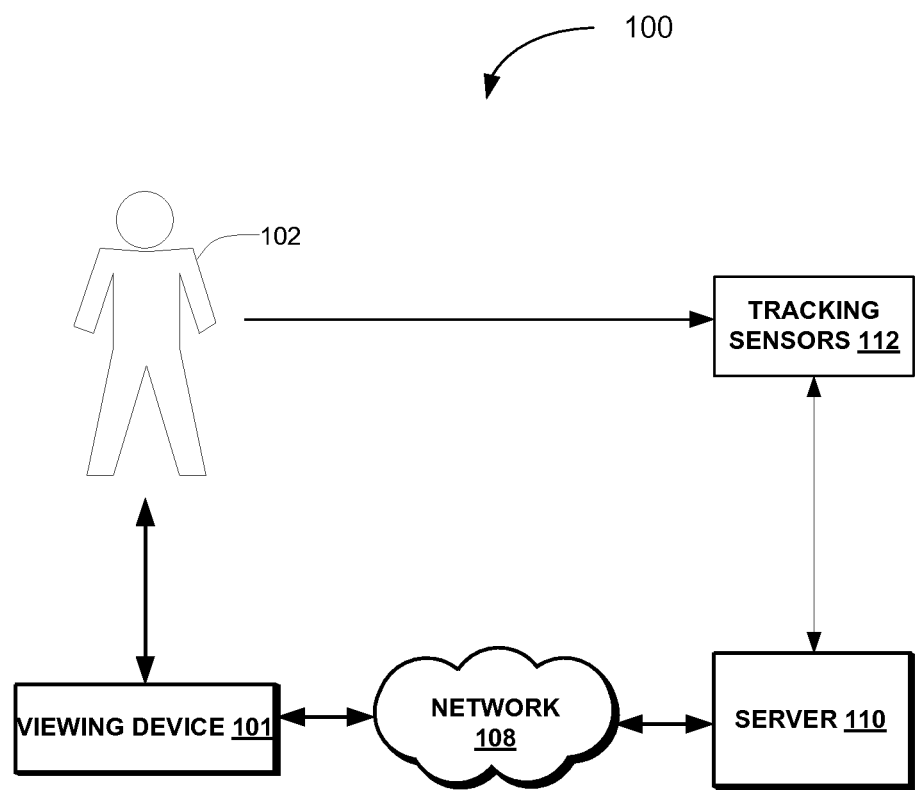
FIG. 1 is a block diagram illustrating an example of a network suitable for offloading processes to an augmented reality server, according to some example embodiments.

Example methods and systems are directed to data manipulation based on real world object manipulation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as in the form of a three-dimensional virtual object overlaid on an image of a physical object captured by a camera of a viewing device. The physical object may include a visual reference that the augmented reality application can identify. A visualization of the additional information, such as the three-dimensional virtual object overlaid or engaged with an image of the physical object is generated in a display of the device. The three-dimensional virtual object may selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional virtual object, a two-dimensional virtual object. For example, the three-dimensional virtual object may include a three-dimensional view of a chair or an animated dinosaur. The two-dimensional virtual object may include a two-dimensional view of a dialog box, menu, or written information such as statistics information for a baseball player. An image of the virtual object may be rendered at the viewing device Because of the limited amount of computing resources on the viewing device, a combination of tracking and rendering processes may be offloaded to external resources, such as a network of servers. A system and method for offloading augmented reality processing is described. A sensor external to a viewing device of a user tracks a location and an orientation of the viewing device. The location and orientation are defined relative to predefined references of a physical environment local to the user. A server receives a request from the viewing device to offload at least one of a tracking process and an augmented reality rendering process. The augmented reality rendering process is based on an augmented reality database. The server generates offloaded processed data based on the request and the location and the orientation of the viewing device. The offloaded processed data is streamed to the viewing device. For example, the server may render an image of virtual and stream the rendered image back to the viewing device. In another example, the server may track the location and orientation of the viewing device relative to its local environment and send that information back to the viewing device. A visualization of the offloaded processed data is generated in the viewing device.

In one example embodiment, the tracking process comprises a process for generating external tracking data based on the location and the orientation of the viewing device by using sensors external to the viewing device. The augmented reality rendering process comprises a process for rendering virtual objects based on the external tracking data and the augmented reality database. Rendering is the process of generating an image from a model (or models), by means of computer programs. Also, the results of such a model can be called a rendering.

In another example embodiment, the augmented reality rendering process comprises a process for rendering virtual objects based on internal tracking data from the viewing device and the augmented reality database, the internal tracking data based on the location and the orientation of the viewing device by using sensors internal to the viewing device.

In one example embodiment, the offloaded processed data includes results from a combination of the tracking process and the augmented reality rendering process. The request may include an instruction for a partial augmented reality rendering process. The server generates offloaded processed data based on the partial augmented reality rendering process and the partial augmented reality rendering process renders, at the server, a first number of virtual objects less than the total number of virtual objects associated with the location and the orientation of the viewing device. The viewing device renders a second number of virtual objects less than the total number of virtual objects associated with the location and orientation of the viewing device. The first number of virtual objects is associated with a central portion of the display of the viewing device. The second number of virtual objects is associated with a peripheral portion of the display of the viewing device.

In one example embodiment, the offloaded processed data includes the external tracking data, with the viewing device configured to render virtual objects based on the external tracking data received from the server. The virtual objects are displayed in the display of the viewing device relative to the predefined references of the physical environment local to the user.

In one example embodiment, the viewing device adjusts the visualization of the offloaded processed data using updated internal tracking data from the viewing device. The updated internal tracking data is more recent than the internal tracking data. A position of the virtual objects in the display of the viewing device is relative to the predefined references of the physical environment local to the user.

In one example embodiment, the sensors include an optical device to determine what the user is looking at in the physical environment local to the user. The location includes a geographic location determined based on wireless data generated by the viewing device or triangulated from the predefined references of the physical environment. The orientation is determined based on gyroscope data from the viewing device or is externally determined based on a three-dimensional camera sensor. The viewing device comprises the display in a mobile communication device hand held by the user or a transparent display mounted to a head of the user. The viewing device may be mounted to other apparatuses.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an augmented reality application of a device, according to some example embodiments. The network environment 100 includes a viewing device 101 and a server 110, communicatively coupled to each other via a network 108. The viewing device 101 and the server 110 may each be implemented in a computer system, in whole or in part, as described below with respect to FIG. 12.

The server 110 may be part of a network-based system. For example, the network-based system may be or include a cloud-based server system that provides additional information, such as three-dimensional models, to the viewing device 101.

FIG. 1 illustrates a user 102 using the viewing device 101. The user 102 may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the viewing device 101 and may be a user 102 of the viewing device 101. For example, the viewing device 101 may be a computing device with a display such as a smartphone, a tablet computer, or a wearable computing device (e.g., watch or glasses). The computing device may be hand held or may be removable mounted to a head of the user 102. In one example, the display may be a screen that displays what is captured with a camera of the viewing device 101. In another example, the display of the device may be transparent such as in lenses of wearable computing glasses. In other examples, the display may be a transparent display such as a windshield of a car, plane, truck. The display may be non-transparent and wearable by the user to cover the field of vision of the user.

The user 102 may be a user of an application in the viewing device 101. The application may include an augmented reality application configured to provide the user 102 with an experience triggered by a physical object, such as, a two-dimensional physical object (e.g., a picture), a three-dimensional physical object (e.g., a statue), a location (e.g., at lobby of a casino), or any references (e.g., perceived corners of walls or furniture) in the real world physical environment. For example, the user 102 may point a camera of the viewing device 101 to capture an image of the two-dimensional physical object. The image is tracked and recognized locally in the viewing device 101 using a local context recognition dataset module of the augmented reality application of the viewing device 101. The local context recognition dataset module may include a library of virtual objects associated with real-world physical objects or references. The augmented reality application then generates additional information corresponding to the image (e.g., a three-dimensional model) and presents this additional information in a display of the viewing device 101 in response to identifying the recognized image. If the captured image is not recognized locally at the viewing device 101, the viewing device 101 downloads additional information (e.g., the three-dimensional model) corresponding to the captured image, from a database of the server 110 over the network 108.

In one example embodiment, the viewing device 101 may wish to offload some processes (tracking and rendering of virtual objects to be displayed in the viewing device 101) using the tracking sensors 112 and computing resources of the server 110.

The tracking sensors 112 may be used to track the location and orientation of the viewing device 101 externally without having to rely on the sensors internal to the viewing device 101. The tracking sensors 112 may include optical sensors (e.g., depth-enabled 3D camera), wireless sensors (Bluetooth, wifi), GPS sensor, and audio sensor to determine the location of the user 102 having the viewing device 101, distance of the user 102 to the tracking sensors 112 in the physical environment (e.g., sensors placed in corners of a venue or a room), the orientation of the viewing device 101 to track what the user 102 is looking at (e.g., direction at which the viewing device 101 is pointed, viewing device 101 pointed towards a player on a tennis court, viewing device 101 pointed at a person in a room).

The computing resources of the server 110 may be used to determine and render virtual objects based on the tracking data (generated internally with the viewing device 101 or externally with the tracking sensors 112). The augmented reality rendering is therefore performed on the server 110 and streamed to the viewing device 101. As such, the viewing device 101 does not have to compute and render any virtual object and may display the already rendered virtual object in a display of the viewing device 101.

In another embodiment, data from the tracking sensors 112 may be used for analytics data processing at the server 110 for analysis on usage and how the user 102 is interacting with the physical environment. For example, the analytics data may track at what the locations (e.g., points or features) on the physical or virtual object the user 102 has looked, how long the user 102 has looked at each location on the physical or virtual object, how the user 102 held the viewing device 101 when looking at the physical or virtual object, which features of the virtual object the user 102 interacted with (e.g., such as whether a user 102 tapped on a link in the virtual object), and any suitable combination thereof. The viewing device 101 receives a visualization content dataset related to the analytics data. The viewing device 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 8-11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
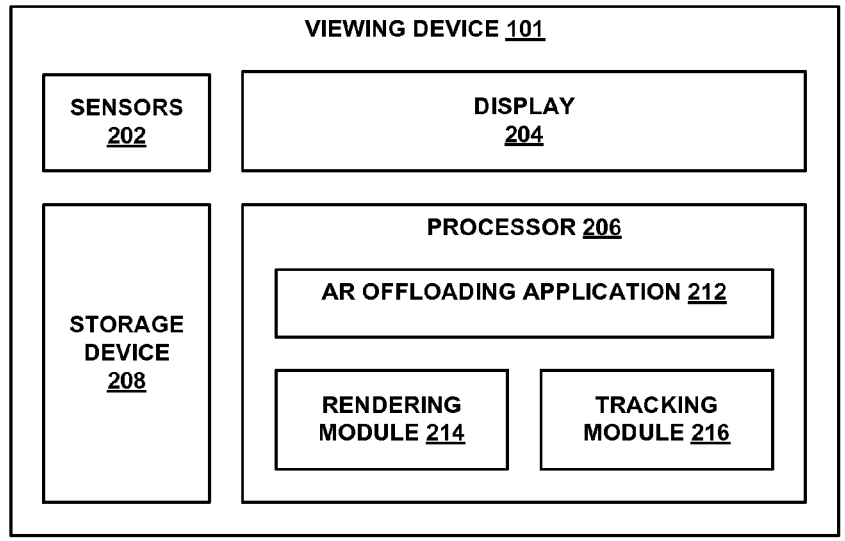
FIG. 2 is a block diagram illustrating an example embodiment of modules (e.g., components) of a viewing device.

FIG. 2 is a block diagram illustrating modules (e.g., components) of the viewing device 101, according to some example embodiments. The viewing device 101 may include sensors 202, a display 204, a processor 206, and a storage device 208. For example, the viewing device 101 may be a wearing computing device, desktop computer, a vehicle computer, a tablet computer, a navigational device, a portable media device, or a smart phone of a user 102. The user 102 may be a human user (e.g., a human being), a machine user (e.g., a computer configured by a software program to interact with the viewing device 101), or any suitable combination thereof (e.g., a human assisted by a machine or a machine supervised by a human).

The sensors 202 may include, for example, a proximity or location sensor (e.g., near field communication, GPS, Bluetooth, Wifi), an optical sensor (e.g., camera), an orientation sensor (e.g., gyroscope), an audio sensor (e.g., a microphone), or any suitable combination thereof. For example, the sensors 202 may include a rear facing camera and a front facing camera in the viewing device 101. It is noted that the sensors described herein are for illustration purposes and the sensors 202 are thus not limited to the ones described.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Head-Up Display).

The processor 206 may include an augmented reality offloading application 212, a rendering module 214, and a tracking module 216. The augmented reality offloading application 212 may orchestrate and determine which process to offload to the server 110. The rendering module 214 renders virtual objects based on what is being detected by the sensors 202. The tracking module 216 generates internal tracking data of the viewing device 101 using the sensors 202 to determine what the viewing device 101 is capturing or looking at in the real physical world.

The augmented reality offloading application 212 may offload a combination of tracking and rendering processes to the server 110. For example, the augmented reality offloading application 212 may offload only the rendering process to the server 110 while still providing tracking data (using the sensors internal to the viewing device 101) to the server 110. In another example, the augmented reality offloading application 212 may offload only the tracking process to the server 110 while rendering virtual objects at the viewing device 101 using external tracking data provided to the viewing device 101. In another example, the augmented reality offloading application 212 may offload both the rendering process and the tracking to the server 110. In another example, the augmented reality offloading application 212 may offload a portion of the rendering process to the server 110 (e.g., the server 110 renders virtual objects A, B, and C and the viewing device 101 renders virtual objects D, E, and F based on predefined conditions. For example, virtual objects that require more computing resources for rendering may be rendered on the server 110 while virtual objects that require less computing resources for rendering may be rendered on the viewing device 101. In another example, virtual objects located in a central area of the display 204 may be rendered on the viewing device 101, while virtual objects location in a peripheral area of the display 204 may be rendered on the server 110 and streamed back to the viewing device 101. In another example, the augmented reality offloading application 212 may adjust a visualization of the virtual objects based on an updated tracking data from the sensors 202. For example, the viewing device 101 is pointed at a chair. When the viewing device 101 receives the rendered virtual object from the server 110, the chair has moved. The augmented reality offloading application 212 may then adjust a position of the rendered virtual object in the display 204 based on the last tracked position of the chair. Similarly, the augmented reality offloading application 212 may adjust a visualization of the virtual objects based on an updated tracking data such as reference points (e.g., edges of an object, corners of a room) detected by sensors 202 and tracking sensors 112.

The rendering module 214 may include a local rendering engine that generates a visualization of a three-dimensional virtual object overlaid (e.g., superimposed upon, or otherwise displayed in tandem with) on an image of a physical object captured by a camera of the viewing device 101 in the display 204 of the viewing device 101. A visualization of the three-dimensional virtual object may be manipulated by adjusting a position of the physical object (e.g., its physical location, orientation, or both) relative to the camera of the viewing device 101. Similarly, the visualization of the three-dimensional virtual object may be manipulated by adjusting a position camera of the viewing device 101 relative to the physical object.

In one example embodiment, the rendering module 214 may retrieve three-dimensional models of virtual objects associated with a real world physical object captured using the tracking module 216. For example, the captured image may include a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object (e.g., an image that has been previously determined to correspond to the three-dimensional virtual object).

In one example embodiment, the rendering module 214 may include a manipulation module that identifies the physical object (e.g., a physical telephone), access virtual functions (e.g., increase or lower the volume of a nearby television) associated with physical manipulations (e.g., lifting a physical telephone handset) of the physical object, and generate a virtual function corresponding to a physical manipulation of the physical object.

In another example embodiment, the viewing device 101 includes a contextual local image recognition module (not shown) configured to determine whether the captured image matches an image locally stored in a local database of images and corresponding additional information (e.g., three-dimensional model and interactive features) on the viewing device 101. In one embodiment, the contextual local image recognition module retrieves a primary content dataset from the server 110, generates and updates a contextual content dataset based on an image captured with the viewing device 101.

The storage device 208 may be configured to store a database of visual references (e.g., images) and corresponding experiences (e.g., three-dimensional virtual objects, interactive features of the three-dimensional virtual objects). For example, the visual reference may include a machine-readable code or a previously identified image (e.g., a picture of a shoe). The previously identified image of the shoe may correspond to a three-dimensional virtual model of the shoe that can be viewed from different angles by manipulating the position of the viewing device 101 relative to the picture of the shoe. Features of the three-dimensional virtual shoe may include selectable icons on the three-dimensional virtual model of the shoe. An icon may be selected or activated by tapping or moving on the viewing device 101.

In one embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the rendering module 214 of the viewing device 101.

The contextual content dataset includes, for example, a second set of images and corresponding experiences (e.g., three-dimensional virtual object models) retrieved from the server 110. For example, images captured with the viewing device 101 that are not recognized (e.g., by the server 110) in the primary content dataset are submitted to the server 110 for recognition. If the captured image is recognized by the server 110, a corresponding experience may be downloaded at the viewing device 101 and stored in the contextual content dataset. Thus, the contextual content dataset relies on the context in which the viewing device 101 has been used. As such, the contextual content dataset depends on objects or images scanned by the rendering module 214 of the viewing device 101.

In one embodiment, the viewing device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the viewing device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
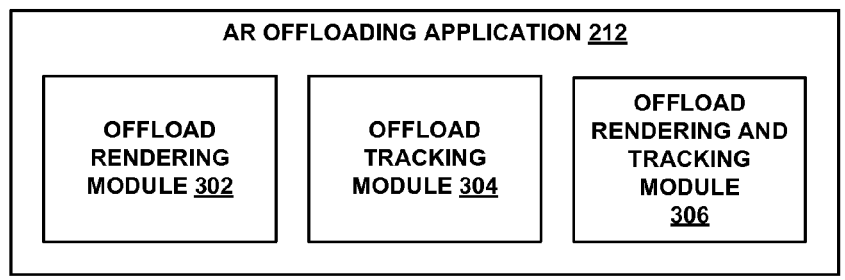
FIG. 3 is a block diagram illustrating an example embodiment of modules (e.g., components) of an augmented reality offloading application.

FIG. 3 is a block diagram illustrating modules (e.g., components) of the augmented reality offloading application 212 of FIG. 2. The augmented reality offloading application 212 may include an offload rendering module 302, an offload tracking module 304, and an offload and tracking module 306.

The offload rendering module 302 may be used to offload only the rendering process to the server 110 while still providing tracking data (using the sensors internal to the viewing device 101) to the server 110. For example, the offload rendering module 302 may send tracking data to the server 110. The server 110 determines which virtual object or information to render based on the tracking data provided by the viewing device 101. The server 110 renders the virtual object and sends the rendered virtual object to the viewing device 101. As such, the viewing device 101 does not have to use computing resources to render any virtual object.

The offload tracking module 304 may be used to offload only the tracking process to the server 110 while rendering virtual objects at the viewing device 101 using external tracking data provided to the viewing device 101. For example, the offload tracking module 304 may request the server 110 to track the location and position of the viewing device 101 using sensors external to the viewing device 101. The server 110 receives tracking data related to the viewing device 101 using sensors external to the viewing device 101. The server 110 communicates the external tracking data to the viewing device 101. The viewing device 101 renders a virtual object based on the external tracking data provided by the server 110. As such, the viewing device 101 does not have to use or enable its tracking sensors. In another example, the external tracking data may be compared with the viewing device 101 to calibrate the tracking sensors 112 external to the viewing device 101. In another example, the external tracking data may be used to augment internal tracking data generated by the viewing device 101 for further accuracy. An example scenario of using the offload tracking module 304 includes a customer walking into a lobby of a retail store. Sensors placed throughout the retail store may detect the precise location of the customer and the orientation of a viewing device 101 of the customer to determine items that the customer is looking at. So for example, the external tracking data may show that the customer is at the frozen food section and is looking down the dessert aisle, the viewing device 101 may display a virtual ad or coupon related to a specific dessert.

The offload rendering and tracking module 306 may be used to offload both the rendering process and the tracking to the server 110. In such situation, the viewing device 101 uses the least amount of power because tracking data is not determined and virtual objects are not rendered locally. Both tracking data and virtual object rendering are performed at the server 110. The viewing device 101 acts as a streaming device to receive the rendered virtual object and to generate a visualization of the rendered virtual object in the display 204.

In one example, the augmented reality offloading application 212 may offload a portion of the rendering process to the server 110 (e.g., the server 110 renders virtual objects A, B, and C and the viewing device 101 renders virtual objects D, E, and F based on predefined conditions. For example, virtual objects that require more computing resources for rendering may be rendered on the server 110 while virtual objects that require less computing resources for rendering may be rendered on the viewing device 101. In another example, virtual objects located in a central area of the display 204 may be rendered on the viewing device 101, while virtual objects location in a peripheral area of the display 204 may be rendered on the server 110 and streamed back to the viewing device 101.

In another example, the augmented reality offloading application 212 may adjust a visualization of the virtual objects based on an updated tracking data from the sensors 202. For example, the viewing device 101 is pointed at a chair. When the viewing device 101 receives the rendered virtual object from the server 110, the chair has moved. The augmented reality offloading application 212 may then adjust a position of the rendered virtual object in the display 204 based on the last tracked position of the chair.

Figure 4:
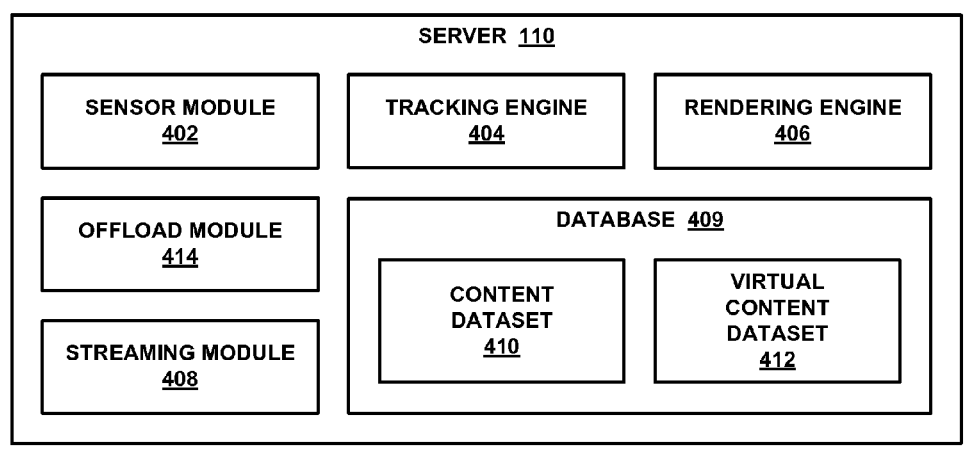
FIG. 4 is a block diagram illustrating an example embodiment of a server.

FIG. 4 is a block diagram illustrating modules (e.g., components) of the server 110. The server 110 includes a sensor module 402, a tracking engine 404, a rendering engine 406, an offload module 414, a streaming module 408, and a database 409.

The sensor module 402 may interface and communicate with tracking sensors 112 to obtain data related to a geographic position, a location, and an orientation of the viewing device 101.

The tracking engine 404 may generate external tracking data based on the data collected from the sensor module 402 and the tracking sensors 112. In another embodiment, the tracking engine 404 may generate tracking data based on the data collected from sensors 202 of the viewing device 101.

The rendering engine 406 may generate a model of a virtual object to be rendered in the display 204 of the viewing device 101 based on a position of the viewing device 101 relative to the physical object. A physical movement of the physical object is identified from an image captured by the viewing device 101. The rendering engine 406 may also determine a virtual object corresponding to the tracking data (either received from the viewing device 101 or generated externally to the viewing device 101) and render the virtual object. Furthermore, the tracking data may identify a real world object being looked at by the viewing device 101. The virtual object may include a manipulable virtual object or displayed augmented information associated with such.

The offload module 414 may receive instructions from the viewing device 101 to offload a combination of the tracking process and the rendering process. In response, the offload module 414 generates commands to the corresponding engines 404 and 406 based on the instructions.

The streaming module 408 communicates the rendered virtual object back to the viewing device 101 such that the viewing device 101 does not have to render the virtual object. In one embodiment, the streaming module 408 may stream a portion of the rendered virtual object and let the viewing device 101 render the remaining portions of the virtual object that are not rendered or sent by the server 110.

The database 409 may store a content dataset 410, a virtual content dataset 412. The content dataset 410 may store a primary content dataset and a contextual content dataset. The primary content dataset comprises a first set of images and corresponding virtual object models. The tracking engine 404 determines that a captured image received from the viewing device 101 is not recognized in the content dataset 410, and generates the contextual content dataset for the viewing device 101. The contextual content dataset may include a second set of images and corresponding virtual object models. The virtual content dataset 412 includes models of virtual objects to be generated upon receiving a notification associated with an image of a corresponding physical object.

Figure 5:
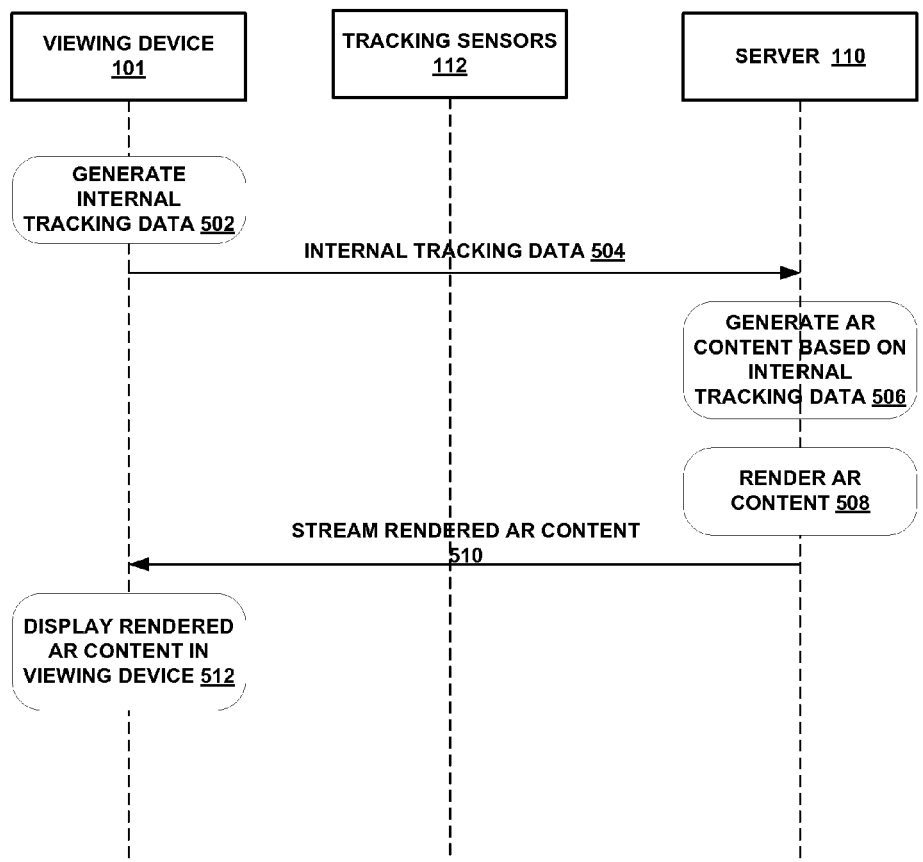
FIG. 5 is a ladder diagram illustrating an example embodiment of offloading rendering at a server.

FIG. 5 is a ladder diagram illustrating an example embodiment of offloading rendering at a server. A viewing device 101 generates internal tracking data using its own sensors 202 at operation 502. At operation 504, the viewing device 101 sends the internal tracking data and a request to offload a rendering process to the server 110. At operation 506, the server 110 generates augmented reality content based on the received internal tracking data from the viewing device 101. At operation 508, the server 110 renders the augmented reality content. At operation 510, the server 110 streams back the rendered augmented reality content to the viewing device 101. At operation 512, the viewing device 101 displays the rendered augmented reality content.

Figure 6:
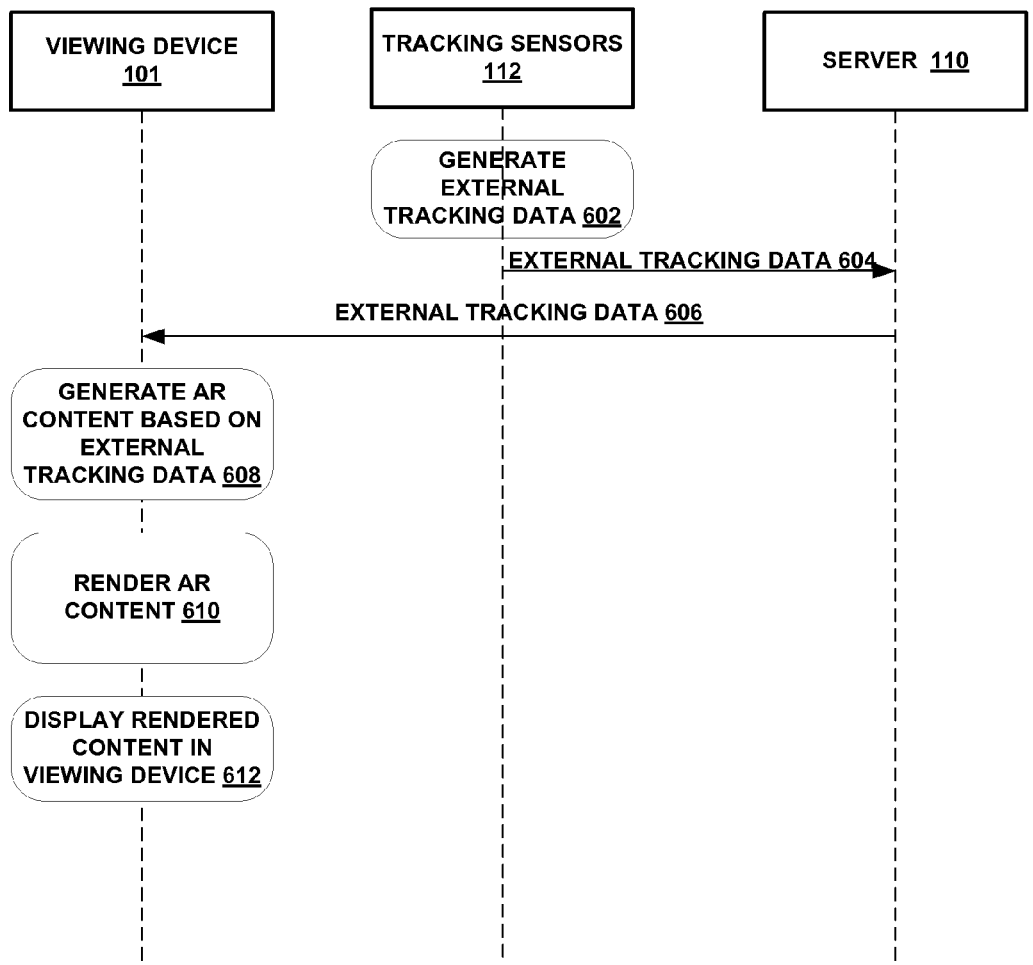
FIG. 6 is a ladder diagram illustrating an example embodiment of offloading tracking at a server.

FIG. 6 is a ladder diagram illustrating an example embodiment of offloading tracking at a server. Tracking sensors 112, which are external to the viewing device 101, generate external tracking data at operation 602. At operation 604 the tracking sensors 112 send the external tracking data to the server 110. At operation 606, the server 110 communicates the external tracking data to the viewing device 101. At operation 608, the viewing device 101 generates augmented reality content based on the external tracking data. At operation 610, the viewing device 101 renders the augmented reality content. At operation 612, the viewing device 101 displays the rendered content in the display 204 of the viewing device 101.

Figure 7:
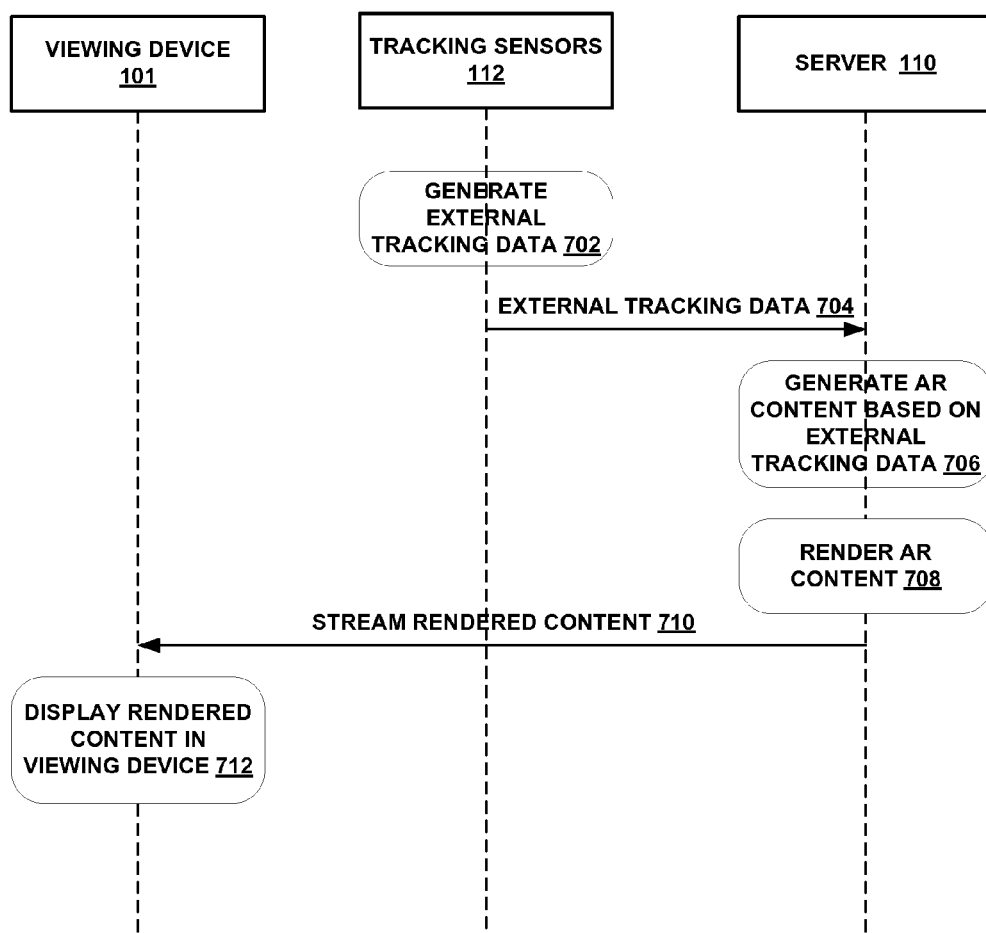
FIG. 7 is a ladder diagram illustrating an example embodiment of offloading tracking and rendering at a server.

FIG. 7 is a ladder diagram illustrating an example embodiment of offloading tracking and rendering at a server. At operation 702, tracking sensors 112, which are external to the viewing device 101, generate external tracking data. The tracking sensors 112 communicate the external tracking data to the server 110 at operation 704. At operation 706, the server 110 generates augmented reality content based on the external tracking data received at operation 704. At operation 708, the server 110 renders the generated augmented reality content based on the external tracking data. At operation 710, the server 110 streams the rendered augmented reality content back to the viewing device 101. At operation 712, the viewing device 101 displays the rendered content.

Figure 8:
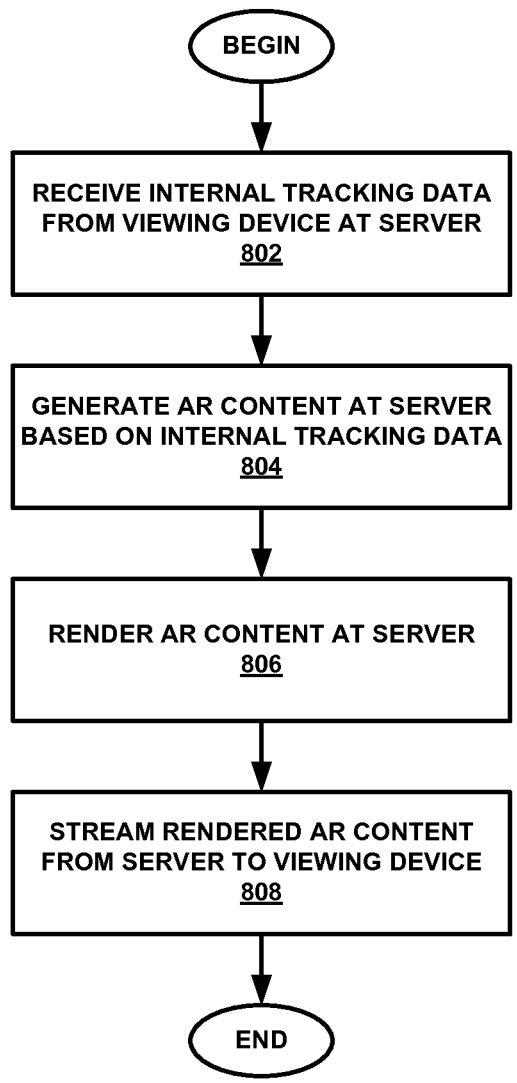
FIG. 8 is a flowchart illustrating an example operation of offloading rendering at a server.

FIG. 8 is a flowchart illustrating an example operation for offloading rendering at a server. At operation 802, internal tracking data is received from a viewing device 101 at a server 110. At operation 804, augmented reality content is identified and generated at the server 110 based on the internal tracking data. At operation 806, augmented reality content is rendered at the server 110. At operation 808, and augmented reality content is streamed from the server 110 to the viewing device 101.

Figure 9:
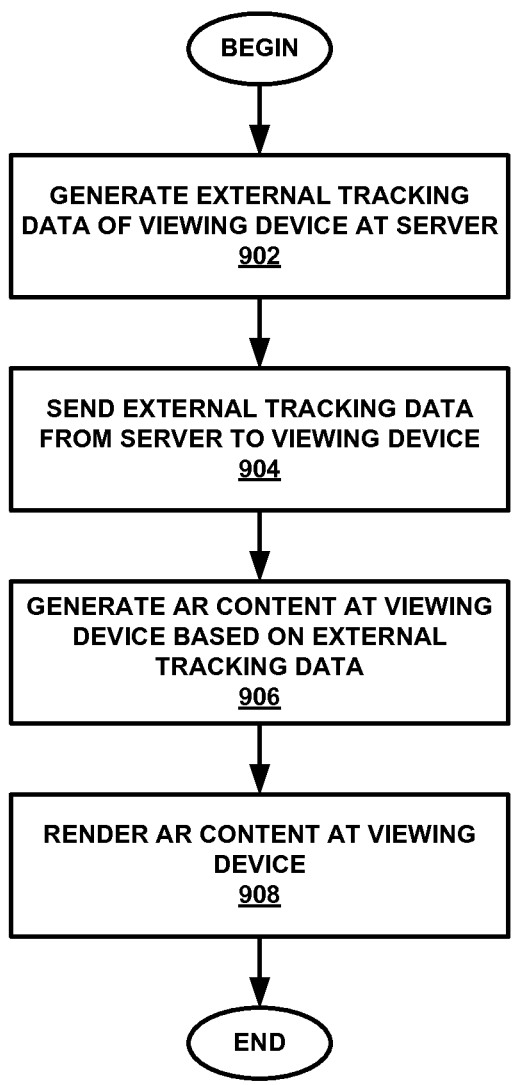
FIG. 9 is a flowchart illustrating an example operation of offloading tracking at a server.

FIG. 9 is a flowchart illustrating an example operation of offloading tracking at a server 110. At operation 902, external tracking data related to a viewing device 101 are generated at a server 110. At operation 904, the external tracking data is sent from the server 110 to the viewing device 101. At operation 906, augmented reality content is generated at the viewing device 101 based on the external tracking data. At operation 908, augmented reality content is rendered at the viewing device 101.

Figure 10:
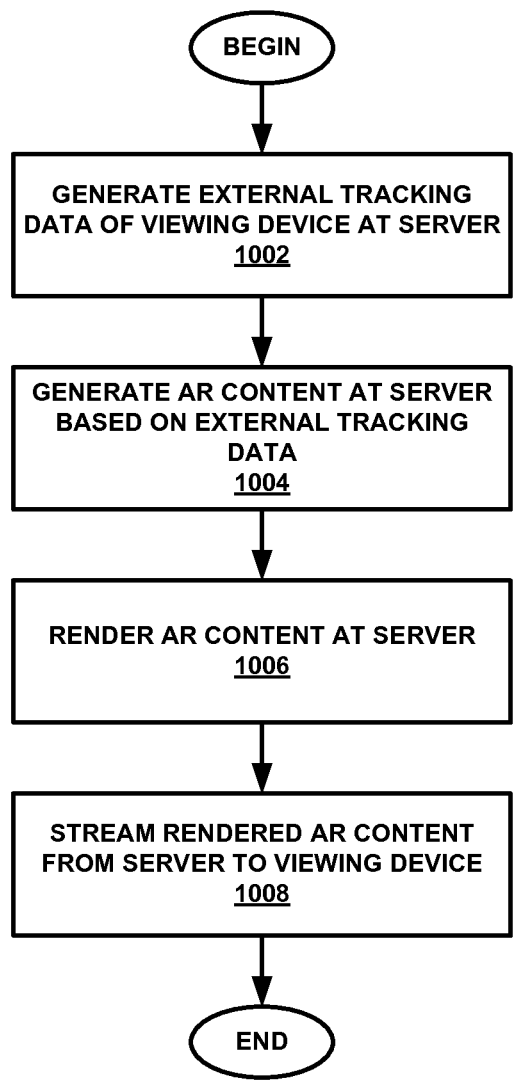
FIG. 10 is a flowchart illustrating an example operation of offloading tracking and rendering at a server.

FIG. 10 is a flowchart illustrating an example operation of offloading tracking and rendering at a server 110. At operation 1002, external tracking data related to a viewing device 101 is generated at a server 110. At operation 1004, augmented reality content is generated at the server 110 based on the external tracking data. At operation 1006, augmented reality content is rendered at the server 110. At operation 1008, the rendered augmented reality content is streamed from the server 110 back to the viewing device 101.

Figure 11:
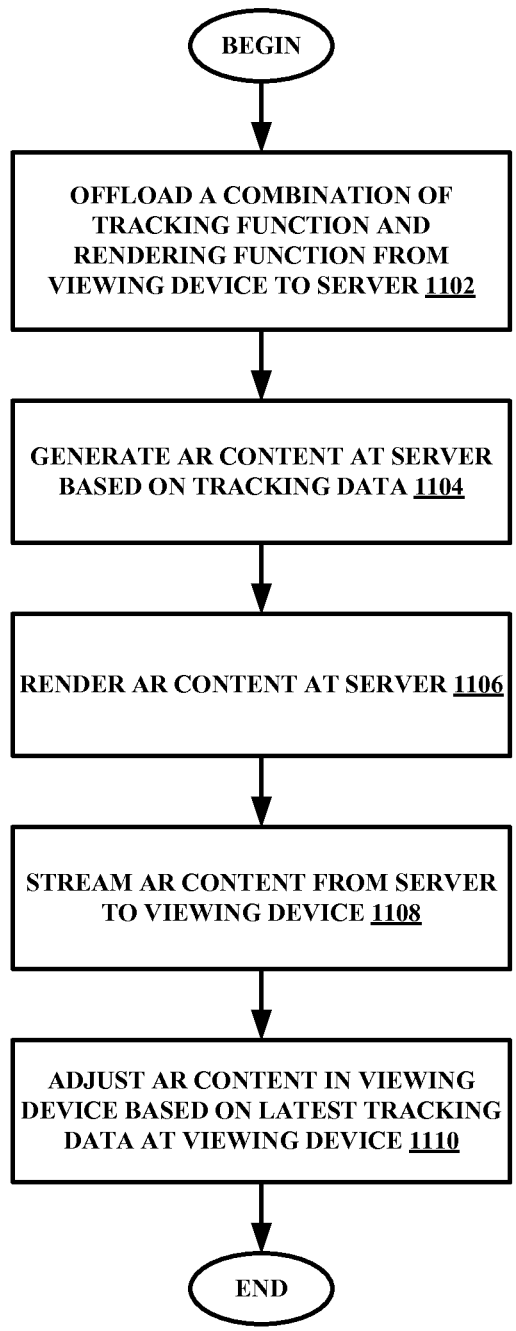
FIG. 11 is a flowchart illustrating an example operation of adjusting an augmented reality content based on updated tracking data at a viewing device.

FIG. 11 is a flowchart illustrating an example operation of adjusting augmented reality content based on updated tracking data at a viewing device 101. At operation 1102, a combination of tracking function and rendering function are offloaded from a viewing device 101 to a server 110. At operation 1104, augmented reality content is generated at the server 110 based on tracking data. At operation 1106, augmented reality content is rendered at the server 110. At operation 1108, the rendered augmented reality content is streamed from the server 110 back to the viewing device 101. At operation 1110, the rendered augmented reality content is adjusted based on the latest tracking data from the viewing device 101. For example, a position of the rendered augmented reality content is adjusted based on a recent motion of the viewing device 101.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
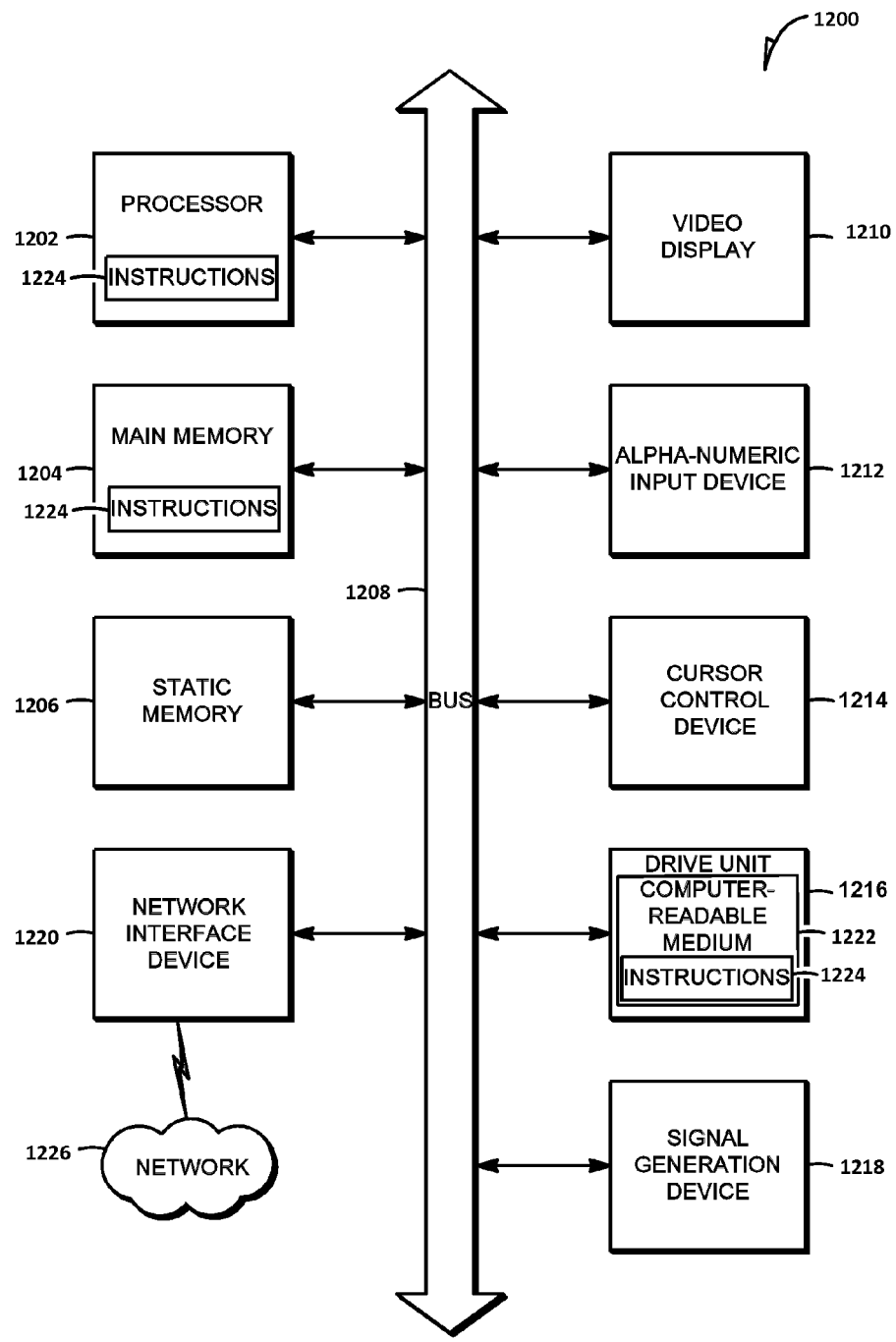
FIG. 12 is a block diagram illustrating components of a machine, according to some example embodiments, able to read instructions from a machine-readable medium and perform any one or more of the methodologies discussed herein.

FIG. 12 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions 1224 for execution by the machine and that cause the machine to perform any one or more of the methodologies of the present embodiments, or that is capable of storing, encoding or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1224 for execution by the machine, and includes digital or analog communications signals or other intangible media to facilitate communication of such software.

Example Mobile Device

Figure 13:
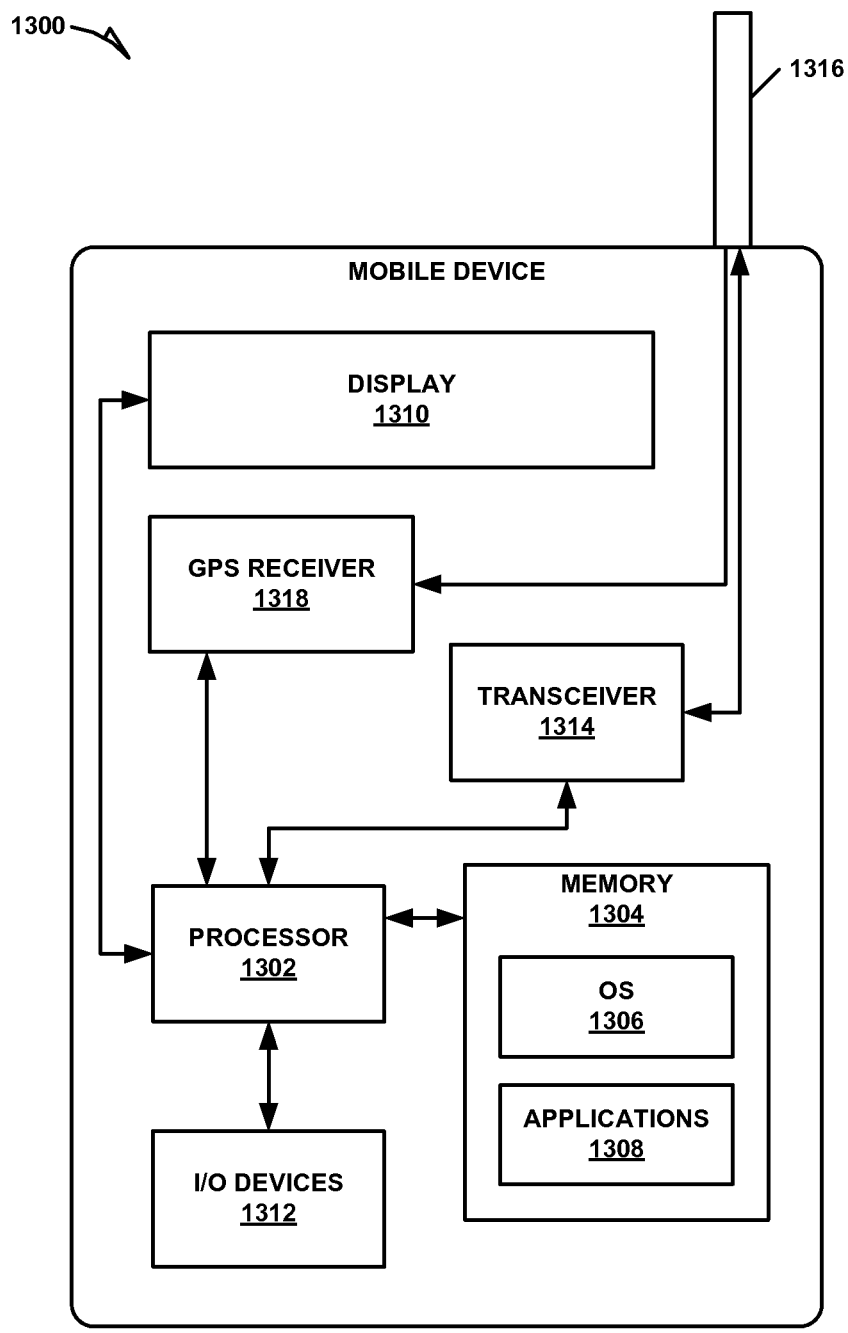
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308, such as a mobile location enabled application that may provide LBSs to a user 102. The processor 1302 may be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A server comprising:
a sensor configured to track a location and an orientation of a viewing device coupled to a user, the location and orientation defined relative to predefined references of a physical environment local to the user;
a storage device comprising an augmented reality database;
a processor configured to:
receive a request from the viewing device to offload at least one of a tracking process and an augmented reality rendering process, the augmented reality rendering process based on the augmented reality database;
generate offloaded processed data based on the request and the location and the orientation of the viewing device, and
stream the offloaded processed data to the viewing device in response to the request, the viewing device configured to generate a visualization of the offloaded processed data in a display of the viewing device,
the request comprising an instruction for a partial augmented reality rendering process, the processor configured to generate offloaded processed data based on the partial augmented reality rendering process, and the partial augmented reality rendering process configured to render, at the server, a first number of virtual objects less than a total number of virtual objects associated with the location and the orientation of the viewing device, the viewing device configured to render a second number of virtual objects less than the total number of virtual objects associated with the location and orientation of the viewing device.

2. The server of claim 1, wherein the tracking process comprises a process for generating external tracking data based on the location and the orientation of the viewing device by using sensors external to the viewing device.

3. The server of claim 2, wherein the augmented reality rendering process comprises a process for rendering virtual objects based on the external tracking data and the augmented reality database.

4. The server of claim 1, wherein the augmented reality rendering process comprises a process for rendering virtual objects based on internal tracking data from the viewing device and the augmented reality database, the internal tracking data based on the location and the orientation of the viewing device by using sensors internal to the viewing device.

5. The server of claim 1, wherein the offloaded processed data include results from a combination of the tracking process and the augmented reality rendering process.

6. The server of claim 1, wherein the first number of virtual objects is associated with a central portion of the display of the viewing device, and wherein the second number of virtual objects is associated with a peripheral portion of the display of the viewing device.

7. The server of claim 2, wherein the offloaded processed data includes the external tracking data, the viewing device is configured to render virtual objects based on the external tracking data received from the server, and the virtual objects displayed in the display of the viewing device are relative to the predefined references of the physical environment local to the user.

8. The server of claim 4, wherein the viewing device is configured to adjust the visualization of the offloaded processed data using updated internal tracking data from the viewing device, the updated internal tracking data being more recent than the internal tracking data, a position of the virtual objects in the display of the viewing device being relative to the predefined references of the physical environment local to the user.

9. The server of claim 1, wherein the sensors include an optical device configured to determine what the user is looking at in the physical environment local to the user,
   wherein the location includes a geographic location determined based on wireless data generated by the viewing device or triangulated from the predefined references of the physical environment,
   wherein the orientation is determined based on gyroscope data from the viewing device or is externally determined based on a three-dimensional camera sensor, and
   wherein the viewing device comprises the display in a mobile communication device hand held by the user or a transparent display mounted to a head of the user.

10. A method comprising:
    tracking a location and an orientation of a viewing device coupled to a user, the location and orientation defined relative to predefined references of a physical environment local to the user;
    storing an augmented reality database in a storage device;
    receiving a request from the viewing device to offload at least one of a tracking process and an augmented reality rendering process, the augmented reality rendering process based on the augmented reality database, the request comprising an instruction for a partial augmented reality rendering process;
    generating offloaded processed data based on the request, and the location and the orientation of the viewing device, the offloaded processed data comprising a rendering of a first number of virtual objects less than a total number of virtual objects associated with the location and the orientation of the viewing device, the viewing device configured to render a second number of virtual objects less than the total number of virtual objects associated with the location and orientation of the viewing device; and streaming the offloaded processed data to the viewing device in response to the request, the viewing device configured to generate a visualization of the offloaded processed data in a display of the viewing device.

11. The method of claim 10, wherein the tracking process comprises a process for generating external tracking data based on the location and the orientation of the viewing device by using sensors external to the viewing device.

12. The method of claim 11, wherein the augmented reality rendering process comprises a process for rendering virtual objects based on the external tracking data and the augmented reality database.

13. The method of claim 10, wherein the augmented reality rendering process comprises a process for rendering virtual objects based on internal tracking data from the viewing device and the augmented reality database, the internal tracking data based on the location and the orientation of the viewing device by using sensors internal to the viewing device.

14. The method of claim 10, wherein the offloaded processed data includes results from a combination of the tracking process and the augmented reality rendering process.

15. The method of claim 10,
    wherein the first number of virtual objects is associated with a central portion in the display of the viewing device, and
    wherein the second number of virtual objects is associated with a peripheral portion of the display of the viewing device.

16. The method of claim 11, wherein the offloaded processed data includes the external tracking data, the viewing device configured to render virtual objects based on the external tracking data received from the server, the virtual objects displayed in the display of the viewing device relative to the predefined references of the physical environment local to the user.

17. The method of claim 13, wherein the viewing device is configured to adjust the visualization of the offloaded processed data using updated internal tracking data from the viewing device, the updated internal tracking data more recent than the internal tracking data, a position of the virtual objects in the display of the viewing device relative to the predefined references of the physical environment local to the user.

18. The method of claim 10, wherein the sensors include an optical device configured to determine what the user is looking at in the physical environment local to the user,
    wherein the location includes a geographic location determined based on wireless data generated by the viewing device or triangulated from the predefined references of the physical environment,
    wherein the orientation is determined based on gyroscope data from the viewing device or is externally determined based on a three-dimensional camera sensor, and
    wherein the viewing device comprises the display in a mobile communication device hand held by the user or a transparent display mounted to a head of the user.

19. A non-transitory machine-readable medium comprising instructions that, when executed by one or more processors of a machine, cause the machine to perform operations comprising:
    tracking a location and an orientation of a viewing device coupled to a user, the location and orientation defined relative to predefined references of a physical environment local to the user;
    storing an augmented reality database in a storage device;
    receiving a request from the viewing device to offload at least one of a tracking process and an augmented reality rendering process, the augmented reality rendering process based on the augmented reality database, the request comprising an instruction for a partial augmented reality rendering process;
    generating offloaded processed data based on the request, and the location and the orientation of the viewing device, the offloaded processed data comprising a rendering of a first number of virtual objects less than a total number of virtual objects associated with the location and the orientation of the viewing device, the viewing device configured to render a second number of virtual objects less than the total number of virtual objects associated with the location and orientation of the viewing device; and streaming the offloaded processed data to the viewing device in response to the request, the viewing device configured to generate a visualization of the offloaded processed data in the viewing device.

* * * * *